United States Patent
Sauter

(10) Patent No.: US 6,810,981 B2
(45) Date of Patent: Nov. 2, 2004

(54) REDUCTION IN TCS CONTROL FREQUENCY WHEN CORNERING ON A ROAD SURFACE HAVING A LOW COEFFICIENT OF FRICTION

(75) Inventor: Thomas Sauter, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/391,308

(22) Filed: Mar. 18, 2003

(65) Prior Publication Data

US 2003/0209377 A1 Nov. 13, 2003

(30) Foreign Application Priority Data

Mar. 28, 2002 (DE) .......................................... 102 13 892
Aug. 23, 2002 (DE) .......................................... 102 38 754

(51) Int. Cl.$^7$ ................................................ B60T 8/24
(52) U.S. Cl. .......................... 180/197; 701/72; 701/73; 701/84
(58) Field of Search ....................... 180/197; 701/70–73, 701/80, 84

(56) References Cited

U.S. PATENT DOCUMENTS

| | | | | |
|---|---|---|---|---|
| 5,732,380 A | * | 3/1998 | Iwata ........................... | 701/85 |
| 5,737,713 A | * | 4/1998 | Ikeda et al. ................... | 701/84 |
| 5,927,421 A | * | 7/1999 | Fukada ........................ | 180/197 |
| 6,161,641 A | * | 12/2000 | Fukumura et al. .......... | 180/197 |
| 6,253,142 B1 | * | 6/2001 | Sauter et al. ................ | 701/82 |
| 6,418,369 B2 | * | 7/2002 | Matsumoto et al. .......... | 701/80 |

* cited by examiner

Primary Examiner—Avraham Lerner
(74) Attorney, Agent, or Firm—Kenyon & Kenyon

(57) ABSTRACT

A traction control system (TCS) in which the engine torque is reduced after a slip threshold has been exceeded by at least one driven wheel and is raised again after the slip has fallen below the threshold, the traction control system further including an arrangement for detecting cornering and coefficient of friction. In order to improve vehicle stability when cornering, upon detection of cornering on a road surface having a low coefficient of friction, the gradient of the engine torque increase during the TCS control action is set lower than when traveling straight ahead.

15 Claims, 2 Drawing Sheets

REDUCTION IN TCS CONTROL FREQUENCY WHEN CORNERING ON A ROAD SURFACE HAVING A LOW COEFFICIENT OF FRICTION

FIELD OF THE INVENTION

The present invention relates to a traction control system (TCS) and a corresponding method.

BACKGROUND INFORMATION

When a vehicle drives onto or accelerates on a slick road surface, its driven wheels relatively quickly begin to slip. If the driven wheels slip so much that they exceed a defined slip threshold, the TCS automatically intervenes in vehicle operation and adapts the engine torque, via an adjustment of the throttle valve, to the respective drive torque that may be transferred to the road. Optionally, the slipping driven wheel or wheels may also be decelerated by manner of a braking intervention. Once the slip has fallen below the defined threshold, the engine torque is raised again.

FIG. 1 shows a typical profile for an engine torque curve during a TCS control cycle. Firstly, the driver increases engine torque relatively sharply (see segment 7 of the curve). At time t1, at least one of the driven wheels exceeds a defined slip threshold, whereupon the TCS greatly reduces engine torque (see downturn 3). Lastly, once slip has fallen below the threshold, the engine torque is increased again in steps (see upper branch 4 of curve) until at time t2, one driven wheel once again exceeds the slip threshold and a new TCS control action begins. The time span between times t1 and t2 is referred to as a TCS control cycle.

At present, the period of one TCS control cycle is approximately 1 second, or the control frequency is, on average, approximately 1 Hz. An addition routine responsible for increasing the engine torque is set so that the drive wheels enter the slip phase approximately once a second. This ensures that after a torque reduction (segment 3), sufficient traction may be built up and hazardous driving situations due to inadequate acceleration may be prevented. This control frequency of approximately 1 Hz is moreover perceived as pleasant by the driver.

The aforementioned settings contribute to relatively comfortable vehicle behavior when traveling straight ahead. When cornering on a slick road surface, however, the drive slip effected deliberately at a frequency of 1 Hz results in poor lateral stability, with the result that the vehicle departs from its track. With rear-wheel-drive vehicles, wheel slip may cause the rear end to break away, and may result in uncontrollable driving situations.

SUMMARY OF THE INVENTION

It is an object of the present invention to improve the behavior of a vehicle during a TCS control action when cornering on a slick road surface, and thereby to improve driving safety.

The present invention provides a traction control system in such a manner that upon detection of a driving situation in which the vehicle is cornering on a road surface having a low coefficient of friction, the gradient of the engine torque increase during the TCS control action is decreased, and is set to a lower value than in a different driving situation, differently than, for example, when driving straight ahead. This may provide that the engine torque rises less quickly, and the moment at which the driven wheel begins to slip and the slip threshold is exceeded occurs considerably later. The duration of a TCS control cycle is thus lengthened.

For detection of the driving situation involving cornering on a surface having a low coefficient of friction, the TCS includes an arrangement for detecting cornering and the coefficient of friction. Detection of this driving situation may occur when defined threshold values are exceeded.

The increase in engine torque after it is reduced by the TCS may be accomplished either in stepped fashion or continuously. With a stepwise increase in engine torque, the initial jump, i.e., the first sharp increase in torque, is selected to be smaller than, for example, when driving straight ahead or at a high coefficient of friction.

The step height of the individual torque increases is preferably also comparatively lower when cornering at a low coefficient of friction than in other driving situations.

Optionally, the gradient of the engine torque increase may also be lowered by lengthening the dwell times between the increase steps.

According to an example embodiment of the present invention, the TCS control action with smaller gradients is performed only when the number of TCS control cycles at a high gradient has reached a defined value.

In addition, the TCS control action according to the present invention is not active when the vehicle acceleration exceeds a defined value. High vehicle accelerations are an indication of a high coefficient of friction, so that in such a case a low coefficient of friction may be ruled out. If, however, only low vehicle acceleration values are identified simultaneously with drive slip, it may be concluded that the TCS control action according to the present invention is necessary.

According to an example embodiment of the present invention, the gradient of the engine torque increase is set as a function of the (at least qualitatively) identified coefficient of friction, the gradient being flatter, the lower the coefficient of friction that is identified.

The gradient of the engine torque increase may also be set as a function of the vehicle speed; the gradient should be flatter for higher vehicle speeds.

The period of one TCS control cycle when cornering at a low coefficient of friction should be at least 1.5 seconds, in particular at least 2 seconds, and should be at least 3 seconds with low coefficients of friction.

A further improvement in vehicle stability may be achieved by the fact that the slip thresholds of the drive wheels are lowered upon detection of cornering at a low coefficient of friction.

If the conditions for activation of the slow engine torque increase according to the present invention are no longer present (i.e., cornering, low coefficient of friction, optionally number of previous control cycles, low vehicle acceleration), the control action according to the present invention may be maintained for a defined follow-on period. It is thereby possible to ensure that even if cornering or the coefficient of friction is detected incorrectly (but the vehicle is still in fact cornering at a low coefficient of friction), vehicle safety is guaranteed.

DETAILED DESCRIPTION

Figure 1:
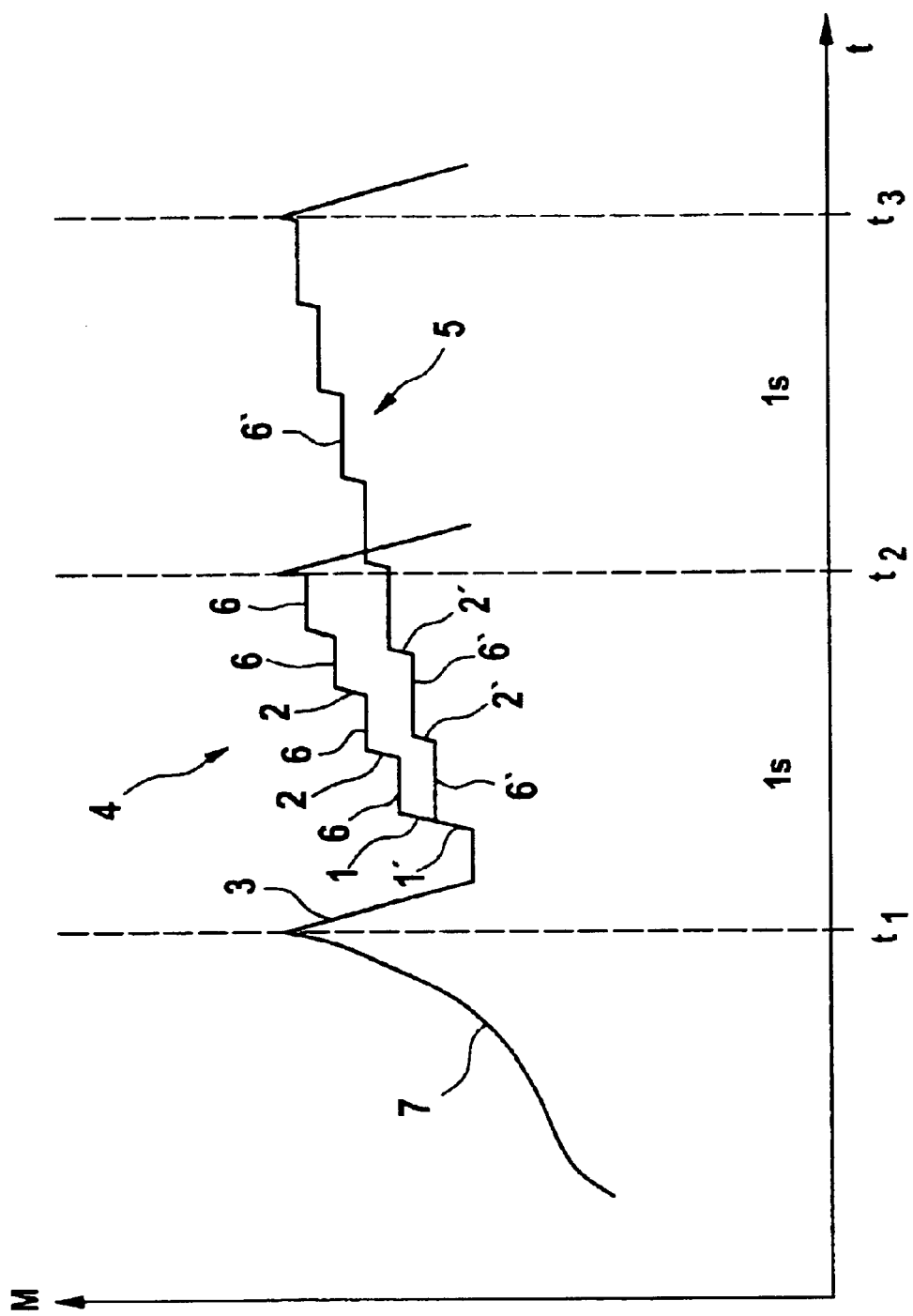
FIG. 1 shows an example of an engine torque profile during a TCS control action.

FIG. 1 shows a typical profile of an engine torque characteristic curve during a TCS control action. After a sharp increase in engine torque (segment 7), at least one of the driven wheels begins to slip and, at time t1, exceeds a defined slip threshold. The TCS control action begins at time t1 and reduces the engine torque to a relatively low value (downturn 3), from which it is raised again in steps (branches 4 and 5) by manner of an addition routine until the wheel once again exceeds the slip threshold at time t2, and a new control cycle begins.

Branch 4 represents a TCS control action in accordance with other systems when cornering or driving straight ahead, and branch 5 represents a TCS control action according to an example embodiment of the present invention when cornering. As is evident from branch 4 of the torque curve, the engine torque is initially increased by manner of a relatively high initial jump 1, and thereafter in relatively high increase steps 2. Dwell times 6 located therebetween are relatively short. The result is a steep gradient for the torque increase.

Upon detection of cornering on a road surface having a low coefficient of friction, however, a substantially flatter torque increase gradient is selected (branch 5). This is done by setting a comparatively lower initial jump 1', longer dwell times 6', and increase steps 2' having a lower step height. As a result, the period of the TCS control cycle is correspondingly lengthened. In the present example, the control period for branch 5 last 2 seconds, but may also be set longer.

The finely graduated torque increase moreover generates only a minimal excess torque which may be quickly dissipated when the slip threshold is exceeded, thus ensuring well-balanced control.

A further improvement in the vehicle's lateral stability may be achieved if, simultaneously with the reduction in the TCS control frequency, the slip thresholds for the driven wheels are reduced. The slip thresholds may be reduced by at least 1 km/h. In vehicles with front-wheel drive the slip thresholds are set to values of less than 2 km/h, and in vehicles with rear-wheel drive to values of less than 1.5 km/h, in particular 1 km/h.

Figure 2:
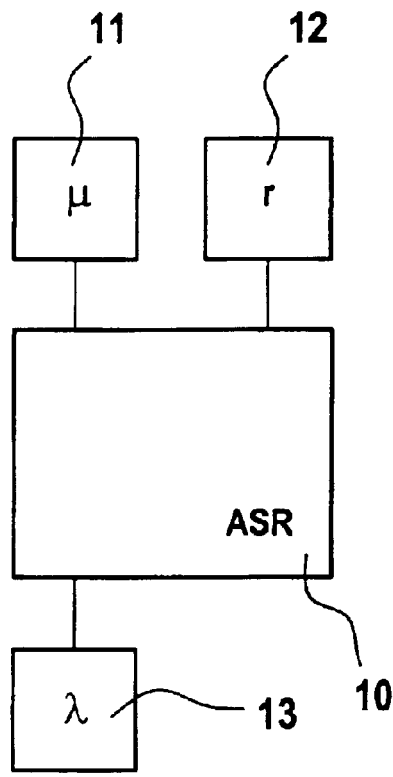
FIG. 2 schematically depicts a TCS system.

FIG. 2 shows a traction control system including a central control unit 10 to which a device 11 for detecting coefficient of friction, a device 12 for detecting cornering, and a device 13 for identifying wheel slip are connected. The respective devices 11, 12, 13 supply corresponding information to control unit 10.

Upon detection of a driving situation in which the vehicle is cornering on a road surface having a low coefficient of friction, control 10, as described above, sets the engine torque gradient increase to a lower value than in other driving situations.

Figure 3:
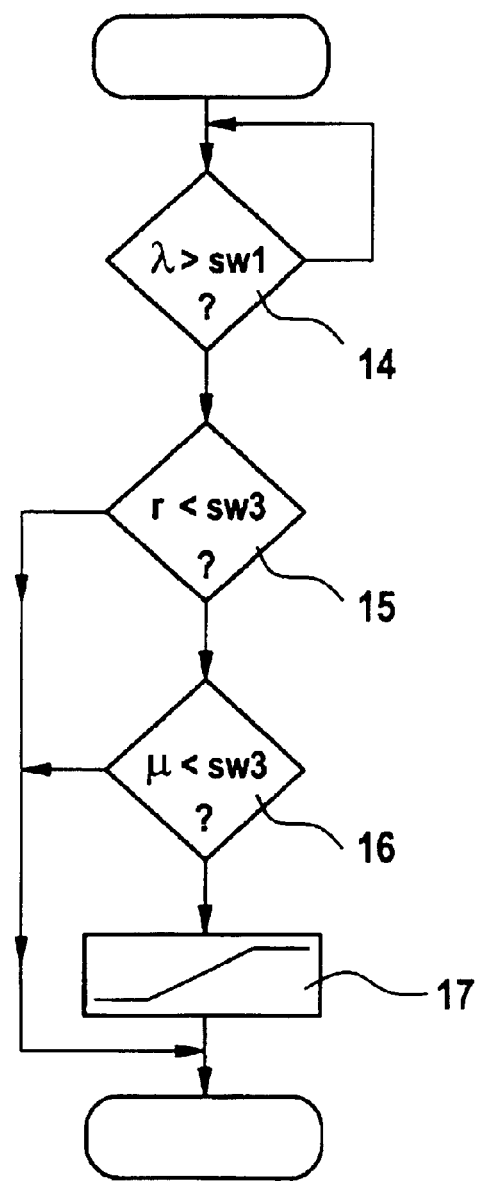
FIG. 3 shows a flow chart explaining the adaptation of a TCS system when cornering on a road surface having a low coefficient of friction.

FIG. 3 shows a flow chart explaining the execution of a drive slip control action with adaptation of the engine torque increase gradient. In a first step 14, the system checks whether a driven wheel has exceeded a defined slip threshold sw1 ($\lambda$>sw1?). If the condition is not met, execution branches back to the beginning of the method. If the condition is met, however, steps 15 and 16 determine whether the vehicle is cornering on a road surface having a low coefficient of friction. This is done by first querying, in step 15, whether curve radius r is less than a defined threshold value sw2 (r<sw2?). If the condition is met, step 16 queries whether coefficient of friction $\mu$ is less than a defined threshold value sw3 ($\mu$<sw3?). If the condition is met, cornering on a road surface having a low coefficient of friction has been detected. If the conditions of steps 15 and 16 are not met, execution branches to the end of the method.

Lastly, in step 17 the gradient of the engine torque increase is set as a function of the coefficient of friction and vehicle speed that have been identified.

What is claimed is:

1. A traction control system for a motor vehicle, comprising:
    an arrangement configured to detect cornering and a coefficient of friction, the arrangement configured to set a gradient of an engine torque increase lower than when traveling straight ahead, upon detection of a driving situation in which the motor vehicle is cornering on a road surface having a low coefficient of friction;
    wherein the arrangement reduces the engine torque after a slip threshold is exceeded by at least one driven wheel, and raises the engine torque again after the slip is below the slip threshold.

2. The traction control system of claim 1, wherein the arrangement is configured to increase the engine torque with a stepwise increase, an initial jump of the engine torque increase during cornering being less than when traveling straight ahead.

3. The traction control system of claim 2, wherein a step height of the increase in engine torque during cornering is comparatively smaller than when traveling straight ahead.

4. A traction control system for a motor vehicle, comprising:
    an arrangement configured to detect cornering and a coefficient of friction, the arrangement configured to set a gradient of an engine torque increase lower than when traveling straight ahead, upon detection of a driving situation in which the motor vehicle is cornering on a road surface having a low coefficient of friction;
    wherein the arrangement reduces the engine torque after a slip threshold is exceeded by at least one driven wheel, and raises the engine torque again after the slip is below the slip threshold;
    wherein the arrangement is configured to increase the engine torque with a stepwise increase, an initial jump of the engine torque increase during cornering being less than when traveling straight ahead; and
    wherein a dwell time between two increase steps of the engine torque during cornering is comparatively longer than when traveling straight ahead.

5. A traction control system for a motor vehicle, comprising:
    an arrangement configured to detect cornering and a coefficient of friction, the arrangement configured to set a gradient of an engine torque increase lower than when traveling straight ahead, upon detection of a driving situation in which the motor-vehicle is cornering on a road surface having a low coefficient of friction;
    wherein the arrangement reduces the engine torque after a slip threshold is exceeded by at least one driven wheel, and raises the engine torque again after the slip is below the slip threshold; and
    wherein the gradient of the engine torque increase is set to a lower value only when a number of previous traction control system control cycles has reached a defined value.

6. The traction control system of claim 1, wherein the gradient of the engine torque increase is set to a lower value only when a vehicle acceleration does not exceed a defined value.

7. The traction control system of claim 1, wherein the arrangement is configured to set the gradient of the engine torque increase as a function of the coefficient of friction that is identified.

8. The traction control system of claim 1, wherein the arrangement is configured to set the gradient of the engine torque increase as a function of one of a vehicle speed and a vehicle acceleration that is identified.

9. The traction control system of claim 1, wherein a period of one traction control system control cycle is at least two seconds.

10. The traction control system of claim 1, wherein a period of one traction control system control cycle is at least three seconds.

11. The traction control system of claim 1, wherein the arrangement is configured to lower the slip threshold of driven wheels upon detection of cornering on a road surface having a low coefficient of friction.

12. A method for drive slip control for a motor vehicle, comprising:

reducing an engine torque after a slip threshold has been exceeded by at least one driven wheel;

increasing the engine torque after a slip has fallen below the slip threshold;

determining whether cornering is present;

determining whether a low road surface coefficient of friction is present; and lowering a gradient of an engine torque increase in a traction control system control cycle when a driving situation is detected in which the motor vehicle is cornering on a road surface having a low coefficient of friction.

13. The method of claim 12, wherein the gradient of the engine torque increase is set as a function of the low road surface coefficient of friction.

14. The method of claim 12, wherein a period of one traction control system control cycle is set to at least two seconds.

15. The method of claim 12, wherein a period of one traction control system control cycle is set to at least three seconds.

* * * * *